United States Patent [19]
Malhotra

[11] Patent Number: 5,075,153
[45] Date of Patent: Dec. 24, 1991

[54] COATED PAPER CONTAINING A PLASTIC SUPPORTING SUBSTRATE

[75] Inventor: Shadi L. Malhotra, Mississauga, Canada

[73] Assignee: Xerox Corporation, Stamford, Conn.

[21] Appl. No.: 383,678

[22] Filed: Jul. 24, 1989

[51] Int. Cl.$^5$ ........................ B41M 5/26; B32B 27/08
[52] U.S. Cl. .................................... 428/207; 428/211; 428/215; 428/511; 428/516; 428/518
[58] Field of Search ............... 428/215, 207, 211, 516, 428/511, 518

[56] References Cited

U.S. PATENT DOCUMENTS

| | | | |
|---|---|---|---|
| 4,592,954 | 6/1986 | Malhotra | 428/335 |
| 4,701,367 | 10/1987 | Malhotra | 428/216 |
| 4,711,816 | 12/1987 | Wittnebel | 428/412 |
| 4,756,961 | 7/1988 | Mouri et al. | 428/323 |
| 4,783,376 | 11/1988 | Sakaki et al. | 428/511 |
| 4,822,674 | 4/1989 | Malhotra | 428/511 |
| 4,840,834 | 6/1989 | Onogi et al. | 428/511 |

*Primary Examiner*—P. C. Sluby
*Attorney, Agent, or Firm*—E. O. Palazzo

[57] ABSTRACT

A never-tear coated paper comprised of a plastic supporting substrate, a binder layer comprised of polymers selected from the group consisting of (1) hydroxypropyl cellulose, (2) poly(vinyl alkyl ether), (3) vinyl pyrrolidone/vinyl acetate, (4) quaternized vinyl pyrrolidone/dialkyalkylaminoethyl/methacrylate, (5) poly(vinyl pyrrolidone), (6) poly(ethylene imine), and mixtures thereof; and a pigment, or pigments; and an ink receiving polymer layer.

39 Claims, No Drawings

COATED PAPER CONTAINING A PLASTIC SUPPORTING SUBSTRATE

BACKGROUND OF THE INVENTION

This invention relates generally to coated papers which, for example, are suitable for various printing processes, and more specifically the present invention is directed to never-tear plastic papers, that is for example papers containing a plastic supporting substrate rather than natural cellulose, with certain coatings thereover and the use of these papers in ink jet printing processes, dot matrix and impact printers, xerographic imaging and thermal transfer printing processes. Thus, in one embodiment, the present invention relates to never-tear papers comprised of a supporting substrate coated on one or both sides with a coating comprised of a polymer such as hydroxypropyl cellulose, which coating contains a pigment, or pigments, such as titanium dioxide, and a top toner or ink receiving layer, which papers can be selected for dry toner imaging and for wax-based ink donor films. The aforementioned top layer can be modified as indicated herein preferably to optimize the selection of the never-tear papers for use with dot matrix printers and typewriters, which modification can, for example, be preferably accomplished by the addition of fillers, such as colloidal silicas in effective amounts of from about 2 to about 20 weight percent. Additionally, in another embodiment of the present invention there are provided never-tear papers for ink jet printing, which papers contain thereover the coatings illustrated hereinafter with effective amounts of colloidal silica dispersed therein in, for example, an amount of from about 2 to about 60 percent by weight, and preferably in an amount of from about 25 to about 60 percent by weight. Accordingly, some of these coated papers of the present invention may also be incorporated into electrostatographic imaging processes, including color processes which employ liquid toners in some embodiments of the present invention.

In a patentability search report the following United States prior art patents were recited: U.S. Pat. No. 4,701,367 relating to coatings such as styrene/butadiene/styrene triblocks for typewriter ribbon transparencies, see the Abstract of the Disclosure for example; U.S. Pat. No. 4,711,816 relating to transparent sheet materials for plain paper electrostatic imaging apparatuses or copiers, which sheets contain an image receiving layer; U.S. Pat. No. 4,783,376, relating to transparencies with a coating layer of a certain electrical resistance; and U.S. Pat. No. 4,756,961 which discloses an ink accepting coating containing particles of silica, aluminum, silicate, zinc oxide, or titanium oxide.

There are disclosed in U.S. Pat. No. 3,759,744 and U.S. Pat. No. 4,268,595 methods for the preparation of electrographic recording papers for imaging. More specifically, electrographic recording papers can be prepared by applying a dielectric coating on a relatively conductive sheet. Various compounds, such as salts and other compounds capable of retaining or attracting moisture in the sheet may be incorporated into the paper to enhance the conductive properties. In some recording papers the conductive layer is applied on one side of the paper and the dielectric is applied to the other side. Also, the dielectric layer can be applied over the conductive layer. Other conventional recording papers comprise an electrically conductive layer and a dielectric layer thereon on one surface of a base paper and an electrically conductive layer on the outer surface of the base paper. Materials selected as the dielectric layer include highly insulating resins such as silicone resins, epoxy resins, poly vinyl acetate resins, vinyl acetate resins, vinyl chloride resins and styrene-butadiene copolymers. These resins are generally dissolved in an organic solvent and coated on the base paper. It is usually necessary to provide an under-coat layer as a barrier coating on a base paper prior to the coating of a solution of an organic solvent type resin to prevent penetration of the solvent used into the paper. Examples of other electrographic papers are prepared by applying a dielectric film of plastic material such as polyethylene or polystyrene to the paper surface by melt extrusion. Also disclosed in U.S. Pat. Nos. 3,011,918; 3,264,137; 3,348,970 and 3,110,621 are-papers for electrostatic recording employing aqueous coatings both for dielectric layer as well as the conductive layer. The materials of the conductive layer are water soluble or dispersable vinyl benzyl quaternary ammonium compounds and the dielectric layer can be comprised of carboxylated poly(vinyl acetate) in an aqueous ammonical solution.

There is also disclosed in U.S. Pat. No. 3,759,744 an electrostatic recording paper, which paper can be prepared by applying three successive aqueous coats to the machine glazed side of a paper web. The first coating contains titanium dioxide and an electroconductive water dispersible polymer of a vinyl benzyl quaternary ammonium compound. The second coating can be comprised of oxidized starch and calcium carbonate. The third coating may contain calcium carbonate and a carboxylated poly (vinyl acetate) in ammonical solution. The resulting web can then be dried between successive coatings and may be steam treated, see the Abstract of the Disclosure for example.

Further, there is disclosed in U.S. Pat. No. 4,268,595 an electrostatic recording material comprising a support having formed thereon a dielectric layer comprised of a terpolymer containing (a) methacrylic acid, (b) a monomer selected from the group consisting of (1) acrylic acid esters containing at least 4 carbon atoms and (2) methacrylic acid esters containing at least 5 carbon atoms, and (c) a monomer selected from the group consisting of (1) acrylic acid esters containing at least 4 carbon atoms and (2) methacrylic esters containing at least 5 carbon atoms, wherein monomer (b) and monomer (c) are different and at least one of the monomers (b) and (c) is an acrylic acid ester containing at least 11 carbon atoms or a methacrylic acid ester containing at least 8 carbon atoms, and a method for producing an electrostatic recording material, which comprises converting such as a terpolymer to a water soluble or water emulsifiable salt of the terpolymer in which about 20 to 100 mol percent of the carboxyl groups present form a salt with ammonia and/or a volatile amine, dissolving or dispersing the terpolymer salt in water, coating the resulting solution or dispersion onto a support, and drying the coating to volatize the ammonia and/or volatile amine.

Also, there is illustrated in U.S. Pat. No. 4,397,883 an electrographic recording material comprising a conductive paper support coated with an electrically insulating layer comprising a blend of a vinyl ester interpolymer latex and up to 500 parts of an inert finely divided pigment per 100 parts by weight of latex interpolymer. The vinyl ester interpolymer which may comprise about 3 to about 7 weight percent of carboxylic acid groups can be provided by an interpolymerized $C_4$–$C_{10}$ vinylene monobasic carboxylic acid monomer. Moreover, disclosed in U.S. Pat. No. 4,481,244 is a material that can be selected for writing or printing, which comprises a substrate and coating layer formed thereon of a coating material containing a polymer having both hydrophilic segments and hydrophobic segments.

Additionally, there is disclosed in U.S. Pat. No. 3,790,435 and U.S. Pat. No. 4,318,950 synthetic papers and methods for the preparation thereof. The term synthetic paper as indicated on page 1, line 20, of U.S. Pat. No. 4,318,950 refers to a paper like laminar structure in the form of thin sheets or films of synthetic resinous material employed for various uses such as writing or printing, as distinguished from natural cellulose paper. Synthetic papers comprised of thermoplastic resins or papers coated with polymeric emulsions are known for use in writing and printing. Disclosed in U.S. Pat. No. 3,380,868 are oriented thermoplastic film laminated structures which can be selected for various imaging processes. Polymeric film structures having a matte-finish and a cellular structure achieved with the addition of fillers which roughens the surface upon stretching of the films and renders them receptive to marking by crayons, pencil and ball-point pen are disclosed in U.S. Pat. No. 3,154,461. Laminates comprising layers of oriented films of thermoplastic materials in which at least one of the outermost layers contains a suitable inert additive are disclosed in U.S. Pat. No. 3,515,626. These laminates are useful in films which may be written on by a pencil or a crayon.

Disclosed in U.S. Pat. No. 3,790,435 are synthetic papers with acceptable foldability of a nonlaminated structure of one thermoplastic resin film or a laminated structure of at least two thermoplastic resin films, see the Abstract of the Disclosure for example. Each of the films is stretched or molecularly oriented, and one or more of the films contain a fine inorganic filler to provide paperness of the film. According to this patent some of the films may contain certain amounts of poly(styrene) as a foldability improving agent.

There is disclosed in U.S. Pat. No. 4,663,216 a synthetic paper printable in high gloss, and comprised of (1) a multilayer support, (2) a layer of a transparent film of a thermoplastic resin free from an inorganic fine powder formed on one surface of the support (1), and (3) a primer layer of a specific material, reference the Abstract of the Disclosure for example. The support (1) comprises (1a) a base layer of a biaxially stretched film of a thermoplastic resin, a surface and a back layer (1b), and (1c) composed of a monoaxially stretched film of a thermoplastic resin containing from 8 to 65 percent by weight of an inorganic fine powder.

Further, there is disclosed in U.S. Pat. No. 4,705,719 a synthetic paper of multilayer resin films comprising a base layer (1a) of a biaxially stretched thermoplastic resin film, and a laminate provided on at least one of opposite surfaces of said base layer, the laminate including a paper-line layer (1b) and a surface layer (1c), the paper-like layer containing a uniaxially stretched film of a thermoplastic resin containing 8 to 65 percent by weight of inorganic fine powder, said surface layer being constituted by a uniaxially stretched film made of a thermoplastic resin. Also known is an electrostatic recording material comprised of a multi-layered sheet support having an electroconductive layer and dielectric layers formed successively thereon, reference for example U.S. Pat. No. 4,795,676.

Never-tear plastic papers (3R109 durable paper available from Xerox Corporation) comprised of a polyester base containing a coating blend of certain binders with titanium dioxide are also known. These aforementioned papers are useful in a single sided xerographic imaging process, however, they possess disadvantages when selected for duplex imaging systems in that, for example, there is an electrostatic buildup of charges during the first printing cycle on one side thereby preventing the paper from a consistent automatic feeding through the xerographic imaging device a second time. Another type of never-tear plastic paper is comprised of an opaque polyester base containing a binder, an antistatic agent and titanium dioxide. These papers possess acceptable charging and discharging characteristics for duplex printing but have disadvantage that the toner in the imaged areas does not fix well to the paper. The disadvantages of these two types of never-tear papers are overcome with the never-tear papers of the present invention wherein the receiving layer is free of pigment such as titanium dioxide as well as an antistatic agent thereby resulting in excellent toner fix primarily because of the presence of, for example, hydroxypropyl cellulose in the pigmented layer underneath the toner receiving layer. The pigmented layer also acts as an antistatic layer, in some embodiments and ensures proper charging and discharging behavior, and thus there is no electrostatic buildup on these never-tear papers resulting in their being ideal for duplex printing.

Also a number of transparencies with, for example, coatings are known, reference for example U.S. Pat. Nos. (1) 3,535,112, which illustrates transparencies with polyamide overcoatings; (2) 3,539,340 wherein transparencies with vinyl chloride overcoatings are described; (3) 4,072,362 which discloses transparencies with overcoating of styrene acrylate or methacrylate ester polymers; (4) 4,085,245 wherein there is disclosed transparencies with blends of acrylic polymers and vinyl acetate polymers; (5) 4,259,422 which discloses, for example, transparencies with hydrophilic colloids; (6) 4,489,122 wherein there is disclosed transparencies containing elastomeric polymers overcoated with poly(vinylacetate), or terpolymers of methylmethacrylate, ethyl acrylate, and isobutylacrylate; and (7) 4,526,847 which discloses transparencies containing coatings of nitrocellulose and a plasticizer.

There are described in the U.S. Pat. No. 4,956,225 transparencies suitable for electrographic and xerographic imaging comprised of a polymeric substrate with a toner receptive coating on one surface thereof, which coating is comprised of blends of poly(ethylene oxide) and carboxymethyl cellulose; poly(ethylene oxide), carboxymethyl cellulose and hydroxypropyl cellulose; poly(ethylene oxide) and vinylidene fluoride/hexafluoropropylene copolymer, poly(chloroprene) and poly(α-methylstyrene); poly(caprolactone) and poly(α-methylstyrene); poly(vinylisobutylether) and poly(α-methylstyrene); blends of poly(caprolactone) and poly(p-isopropyl α-methylstyrene); blends of poly(1,4-butylene adipate) and poly(α-methylstyrene); chlorinated poly(propylene) and poly(α-methylstyrene); chlorinated poly(ethylene) and poly(α-methylstyrene); and chlorinated rubber and poly(α-methylstyrene). Further, in another aspect of the U.S. Pat. No. 4,956,225 there are provided transparencies suitable for electrographic and xerographic imaging processes comprised of a supporting polymeric substrate with a toner receptive coating on one surface thereof comprised of: (a) a first layer coating of a crystalline polymer selected from the group consisting of poly(chloroprene), chlorinated rubbers, blends of poly(ethylene oxide), and vinylidene fluoride/hexafluoropropylene copolymers, chlorinated poly(propylene), chlorinated poly(ethylene), poly(vinylmethyl ketone), poly(caprolactone), poly(1,4-butylene adipate), poly(vinylmethyl ether), and poly(vinyl isobutylether); and (b) a second overcoating layer comprised of a cellulose ether selected from the group consisting of hydroxypropyl methyl cellulose, hydroxypropyl cellulose, and ethyl cellulose.

Additionally there is described in the copending application, U.S. Pat. No. 4,997,697 entitled "Transparencies" with the listed inventor Shadi Malhotra, a transparency comprised of a supporting substrate, an antistatic polymer layer coated on one or both sides of the substrate comprised of hydrophilic cellulosic derivatives, and toner receiving polymer layer thereover on both sides of the antistatic layer comprised of hydrophobic cellulose ethers and cellulose esters in combination with low melt adhesives. Other transparency coatings include blends of poly(ethylene oxide) with carboxymethyl cellulose as illustrated in U.S. Pat. No. 4,592,954, the disclosure of which is totally incorporated herein by reference, blends of carboxymethyl cellulose, poly(ethylene oxide) and hydroxypropyl cellulose, reference U.S. Pat. No. 4,865,914 blends of hydrophilic cellulosic and plasticizers, reference U.S. Pat. No. 5,006,407, the disclosure of which is totally incorporated herein by reference. Further, disclosed in the patent is a transparency comprised of a supporting substrate on an oil absorbing polymer layer on both sides of the substrate and an ink receiving polymer layer thereon. The ink receiving layer may contain fillers.

Although the papers illustrated in the prior art are suitable for their intended purposes, there remains a need for papers with new coatings thereover that are useful in ink jet printing processes, electrophotographic imaging and printing processes, including color processes, and that will enable the formulation of images with high optical densities. Additionally, there is a need for never-tear papers that can be selected for duplex copying processes. Another need of the present invention resides in providing papers with coatings that do not block (stick) at, for example, 50 percent relative humidity and at a temperature of 50° C. Further, there is a need for never-tear papers that avoid or minimize jamming at the fuser roll, thus shorting the life thereof. Also, there is a need for static-free never-tear papers, or wherein the static charge thereon is minimized or substantially avoided. Another need resides in the provision of never-tear papers for ink jet, dot matrix, typewriters and crayon printing processes, and wherein images of high optical density, such as greater than one, are obtained in embodiments of the present invention.

SUMMARY OF THE INVENTION

It is an object of the present invention to provide papers with many of the advantages illustrated herein.

Another object of the present invention resides in the provision of ink jet papers, or xerographic papers with certain coatings thereover.

Also, in another object of the present invention there are provided papers with certain coatings thereover thus enabling images with high optical densities.

Another object of the present invention resides in ink jet never-tear papers that permit the substantial elimination of beading caused by poor inter-drop coalescence during mixing of the primary colors to generate secondary colors such as, for example, mixtures of cyan and yellow enabling green colors.

Furthermore, in another object of the present invention there are provided electrophotographic never-tear papers that enable elimination of bleeding of colors due to intermingling or diffusion of the dry toners when different colors, for example black, are printed together with another color like magenta.

Additionally, another object of the present invention relates to never-tear papers with a number of top coatings thereover containing colloidal silica enabling such coatings to be particularly useful in printing processes such as dot matrix printers, typewriters and with pencil crayons.

Another object of the present invention relates to ink jet papers with specific coatings which enable, for example, water and glycol absorption from the inks selected in a rapid manner thereby permitting such papers to be particularly useful in known ink jet printers.

In yet another object of the present invention there are provided coatings which are compatible with filled papers, sized papers and opaque Mylars, which coatings will enable the aforementioned materials to generate high optical density images with electrophotographic processes utilizing, for example, liquid toners comprised of a toner resin dispersed in a solvent such as Isopars.

Additionally, in another object of the present invention there are provided low dielectric never-tear papers wherein the ink receiving layer is free of titanium dioxide and an antistatic agent thereby resulting in, for example, excellent toner fix during electrographic and electrophotographic processes.

These and other objects of the present invention are accomplished by providing papers with coatings thereover. More specifically, in accordance with one embodiment of the present invention there are provided papers with coatings thereover which are compatible with the inks, or dry toners selected for marking, and wherein the coatings enable acceptable optical density images to be obtained, especially in duplex imaging processes. In one embodiment of the present invention there are provided never-tear papers comprised of a supporting substrate preferably coated on both sides with a polymer binder resin containing a pigment (pigmented layer), and an ink receiving, layer in contact with both sides of the aforementioned pigmented layers, which ink receiving layer is comprised of, for example, a blend of chlorinated rubber with ethylene/vinyl acetate.

Embodiments of the present invention include a paper comprised of a plastic supporting substrate, a binder layer comprised of polymers selected from the group consisting of (1) hydroxypropyl cellulose, (2) poly(vinyl alkyl ether), (3) vinyl pyrrolidone/vinyl acetate, (4) quaternized vinyl pyrrolidone/dialkylaminoethyl/methacrylate, (5) poly(vinyl pyrrolidone), (6) poly(ethylene imine), and mixtures thereof, and a pigment, or pigments; and an ink receiving polymer layer; and more specifically a coated never-tear paper comprised of a plastic supporting substrate, a resin binder layer in contact with the substrate and comprised of polymers selected from the group consisting of (1) hydroxypropyl cellulose, (2) poly(vinyl alkyl ether), (3) vinyl pyrrolidone/vinyl acetate, (4) quaternized vinyl pyrrolidone/dialkylaminoethyl/methacrylate, (5) poly(vinyl pyrrolidone), (6) poly(ethylene imine), and mixtures thereof, and an inorganic pigment or pigments; and an ink receiving polymer layer in contact with the resin binder layer.

A specific embodiment of the present invention is directed to never-tear papers, that is for example paper which will not tear in the routine handling thereof in an office environment, as compared to, for example, a natural cellulose paper which has a limited life and is not as durable, which never-tear paper is comprised of a supporting substrate such as a polyester, which substrate contains on one or preferably both sides an antistatic or pigmented coating comprised of certain resin binders including, for example, hydroxypropyl cellulose, blended with inorganic pigments such as titanium dioxide, high brightness clays, and the like as indicated herein; and a top polymer ink receiving coating comprised, for example, of blends of chlorinated rubber with ethylene/vinyl acetate copolymer (vinyl acetate content of from 40 to about 80 percent by weight) or poly(caprolactone), poly(chloroprene); blends of chlorinated poly(alkenes) such as chlorinated poly(propylene) or chlorinated poly(ethylene) with ethylene/vinyl acetate, or poly(caprolactone) or poly(chloroprene), poly(diallyl phthalate), cellulose propionate, poly(diallyl isophthalate), ethylene-vinylacetate-vinyl alcohol terpolymer, poly(ethylene succinate), and blends of poly(ethylene) chlorosulfonated with ethylene/vinyl acetate, blends of poly(ethylene oxide) with another component selected from the group consisting of (1) hydroxypropyl methyl cellulose; (2) vinylmethyl ether/maleic acid copolymer; (3) acrylamide/acrylic acid copolymer; (4) carboxymethylhydroxyethyl cellulose sodium salt; (5) hydroxyethyl cellulose; (6) water soluble ethylhydroxyethyl cellulose; (7) cellulose sulfate; (8) poly(vinyl alcohol); (9) poly(vinyl pyrrolidone); (10) hydroxybutylmethyl cellulose; (11) hydroxypropyl cellulose; (12) poly(2-acrylamido-2-methyl propane sulfonic acid); (13) methyl cellulose; (14) hydroxyethylmethyl cellulose; (15) poly(diethylene triamine-co-adipic acid); (16) poly(imidazoline) quaternized; (17) poly(ethylene imine) epichlorohydrin; (18) poly(N, N-dimethyl-3, 5-dimethylene piperidinium chloride); or (19) ethoxylated poly(ethylene imine).

Another specific embodiment of the present invention is directed to xerographic never-tear papers comprised of a supporting substrate such as a polyester, which contains on both sides a pigmented coating in a thickness of from about 5 to 50 microns on each side of a blend of hydroxypropyl cellulose, 75 percent by weight, and inorganic pigments such as titanium dioxide, 25 percent by weight, and a second ink receiving layer in contact with the pigmented layer, which ink receiving layer is of a thickness of from about 2 to about 25 microns and preferably of 10 microns, and is comprised of a blend of chlorinated rubber (preferably with 65 percent by weight chlorine), 75 percent by weight, and ethylene/vinyl acetate copolymer (preferably with a vinyl acetate content of 40 percent by weight), 25 percent by weight. The pigmented polymeric coating (polymer resin binder with pigment, preferably dispersed therein) can be applied to the substrate from a mixture of an alcohol, such as methanol, of about 75 percent by weight and water of about 25 percent by weight. Under such conditions, hydroxypropyl cellulose, and many of the other polymer binders are very effective as a binder for the inorganic pigments such as titanium dioxide, and possesses antistatic properties. The ink receiving layer can be applied to the dried pigmented polymeric layer from a low boiling point polar solvent, such as acetone, methylethylketone, and dichloromethane, to maintain the effectiveness of the antistatic properties of the pigmented polymeric layer. Such never-tear coated papers possess excellent charge acceptance characteristics on both sides which allow them to be useful in duplex printing.

When the ink receiving layer is applied from a nonpolar high boiling point solvent such as toluene, the effectiveness of the antistatic properties of hydroxypropyl cellulose and titanium dioxide pigmented layer can be somewhat reduced for xerographic duplex printing processes in some instances because of to residual charge that remains on the printed side when the coated paper is initially fed through the xerographic, or similar imaging or printing apparatus. To overcome this deficiency, the pigmented layer can be enriched with water soluble and methanol compatible polymeric electrolytes comprised of poly anions such as poly acrylic acid sodium salt, or polycations such as poly(N,N-dimethyl-3,5-dimethylene piperidinium chloride), quaternized poly(imidazoline), quaternized poly(dimethyl amine-epichlorohydrin), and the like. The selection of the poly(electrolyte) antistatic agent is dependant on a number of factors such as (a) capacity to bind titanium dioxide to polyester, (b) charge strength of the poly(electrolyte), (c) compatibility with the binder such as hydroxypropyl cellulose, and (d) should be colorless and odorless.

Blends of hydroxypropyl cellulose, or other similar polymer resin binders and inorganic pigment such as titanium dioxide can be supplemented with light colored odorless antistatic, in an amount of between 10 to 40 percent by weight of the binder resin, poly(electrolytes) of, for example, poly(dimethylamine-co-epichlorohydrin) quaternized, poly(imidazoline) quaternized, poly(acrylic acid) sodium salt, poly(N,N-dimethyl-3,5-dimethylene piperidinium chloride) in water in various amounts and coated on polyester from blends of methanol and water to determine their binding characteristics. Hydroxypropyl cellulose and other reins binders were compatible, that is the blend of hydroxypropyl cellulose and the antistatic agent in a methanol water mixture was transparent (clear); nothing precipitates out and forms one phase. Thus, when an inorganic pigment is added or coated on the substrate, such as Mylar, the coating is smooth and not lumpy. With up to 50 percent by weight of the poly(electrolytes) and the pigmented coating of hydroxypropyl cellulose, titanium dioxide and poly(electrolyte) did not peel off the substrate, such as a polyester, showing good binding properties.

The charge acceptance characteristics and charge decay of the coated papers were measured with a static charge analyzer Model 276 available from Princeton Electro Dynamics. Sample discs of 1 inch diameter were prepared from the coated papers and inserted into the two sample ports on the turntable using tweezers. On rotating the turntable and applying the corona charge to the coating for five seconds, holding the charge in the dark for between 5 to 10 seconds and exposing it to light for a further 10 seconds, plots of voltage versus time were obtained. A comparative evaluation of these plots can provide an evaluation of the effectiveness of the paper, antistatic additives and coatings thereof. For example, uncoated polyester of a thickness of 100 microns tested on the static charge analyzer accepted a charge of about 1,200 volts which did not decay with light. In contrast, a pigmented coating of 25 μm in thickness of hydroxypropyl cellulose with 20 percent by weight of titanium dioxide coated on a polyester accepted a charge of about 1,150 volts, retained charge in the dark and decayed with exposure to light. With incorporation of 10 percent by weight of poly(N,N-dimethyl-3,5-dimethylene piperidinium chloride) to the aforementioned coating blend of hydroxypropyl cellulose and titanium dioxide, and coating thereof on the polyester, a coated paper was obtained which accepted a charge of 750 volts and decayed instantly when exposed to light. Replacing poly(N,N-dimethyl-3,5-dimethylene piperidinium chloride) with poly(dimethylamineco-epichlorohydrin) quaternized in the aforementioned pigmented coating of hydroxypropyl cellulose with titanium dioxide on polyester, the maximum charge acceptance dropped to 250 volts. Increasing the amount of poly(dimethylamine-epichlorohydrin) quaternized to 40 percent by weight in the pigmented coating of hydroxypropyl cellulose and titanium dioxide, the maximum charge acceptance dropped to 50 volts. At a 40 percent by weight level of poly(N,N-dimethyl-3,5-dimethylene piperidinium chloride) in the pigmented coating of hydroxypropyl cellulose and titanium dioxide, the maximum charge acceptance was 60 volts. These results evidence that the maximum charge acceptable level in never-tear papers of the present invention can be controlled by the amount of the antistatic agent added to the pigmented coating. The preferred value of maximum charge acceptance for papers used in Xerox machines, such as Xerox 1005 TM, is between 125 to 300 volts. The copy quality of images on never-tear papers of the present invention did not show substantial differences between high charge (1,150 volts) acceptance papers or low charge (60 volts) papers. Moreover, the coated never-tear papers of the present invention with high or low charge acceptance did not pose any problem during duplexing providing no residual charge remained after the first cycle. The preferred poly(electrolyte) antistatic agents that can be used in effective amounts of about 10 to about 40 percent by weight in combination with hydroxypropyl cellulose, or other resin binders, and inorganic pigments, such as white titanium dioxide, are poly(dimethylamine-epichlorohydrin) quaternized and poly(N,N-dimethyl3,5-dimethylene piperidinium chloride) due to their high poly(electrolyte) strength, and as these are good cobinders for titanium dioxide. All these poly(electrolytes) are available commercially, Scientific Polymer Products being one of these sources.

The white or colored pigmented layer can contain pigment components in various effective amounts, such as for example for about 2 to about 50 percent by weight of the pigment binder. Examples of pigments that may be used include titanium dioxide present, for example, in one embodiment in an amount of 20 weight percent (available as Rutile or Anatase from NL Chem Canada Inc.); hydrated alumina (Hydrad TMC, Hydrad TM HBF, Hydrad TM HBC, J. M. Huber Corporation), barium sulfate (K.C. Blanc Fix HD80, available from KaliChemie Corporation) (Opalex-C); blend of calcium fluoride and silica (Opalex-C, Kemira OY); calcium carbonate (Microwhite 0.7/paper, Sylacauga Calcium Products, Kaowhite, available from Thiele Kaolin Company, Pfinyl 402 Pfizer Pigments and Metal Division); high brightness clays (ultra gloss 90$^x$ Engelhard paper clays, Astra-paque and Altowhite TE Georgia Kaolin); Dow plastic pigments (722, 788 available from Dow Chemicals), zinc oxide (Zoco Fax 183, ZoChem); and blend of zinc sulfide with barium sulfate (Lithopane, available from Sachteben Company). While it is not desired to be limited by the theory, it is believed that the primary purpose of the pigment is to pacify the substrate.

Specific examples of binders include hydroxypropyl cellulose in methanol (75 percent by weight) and a water (25 percent by weight) mixture (available from Klucel, Type E, Hercules), poly(ethylene imine) in water (Scientific Polymer Products), poly(vinyl methyl ether) in water (Gantrez M-154, GAF Corporation), poly(vinyl pyrrolidone) (PVPK-60 GAF Corporation) in methanol, vinyl pyrrolidone/vinyl acetate copolymer in isopropanol, 75 percent by weight, and water, 25 percent by weight, (vinyl acetate content, 50 percent by weight, Scientific Polymer Products), vinyl pyrrolidone/dimethyl amino ethylmethacrylate quaternized in water (#372, Scientific Polymer Products), with hydroxypropyl cellulose being preferred primarily because of its availability, excellent binding characteristics, and effective antistatic properties.

Illustrative examples of substrates with a thickness of, for example, from about 50 microns to about 150 microns, and preferably of a thickness of from about 50 microns to about 75 microns that may be selected for the coated papers include Mylar, commercially available from E.I. DuPont; Melinex, commercially available from Imperials Chemical, Inc.; Celanar, commercially available from Celanese; polycarbonates, especially Lexan; polysulfones; cellulose triacetate; polyvinylchlorides, cellophane; and the like, with Mylar being particularly preferred in view of its availability and lower costs.

Illustrative examples of ink receiving layers of, for example, a thickness of from about 2 to about 25 microns, preferably for each side of the pigmented layer and in contact with the pigmented layer comprised of polymer resin bider and pigment, preferably an inorganic pigment such as titanium dioxide dispersed therein, include poly(ethylene succinate) (available from Scientific Polymer Products) in dichloromethane, poly(diallyl phthalate) (Scientific Polymer Products) in acetone, poly(diallylisophthalate) (Scientific Polymer Products) in acetone, cellulose propionate in acetone (Scientific Polymer Products), ethylene-vinyl acetatevinyl alcohol terpolymer (with ethylene contents of 40 percent by weight, vinyl acetate content of 40 percent by weight, and vinyl alcohol content of 20 percent by weight in acetone) which can be obtained by partial hydrolysis of ethylene vinyl acetate copolymer with vinyl acetate content of 60 percent by weight (available from Scientific Polymer Products); blends of chlorinated rubber (chlorine content 65 percent by weight, available from Scientific Polymer Products) from about 10 to about 90 percent by weight and ethylene/vinyl acetate copolymer (vinyl acetate content 40 percent by weight) from about 90 to about 10 percent by weight in dichloromethane as well as in toluene; blends of chlorinated rubber (chlorine content 65 percent by weight, Scientific Polymer Products) from about 10 to about 90 percent by weight and poly(caprolactone) (PLC-700, available from Union Carbide) from about 90 to about 10 percent by weight in dichloromethane; blends of chlorinated rubber (chlorine content 65 percent by weight, Scientific Polymer Products) from about 10 to about 90 percent by weight and poly(chloroprene) (Scientific Polymer Products) from about 90 to about 10 percent by weight in dichlormethane; blends of poly(- propylene) chlorinated (chlorine content 65 percent by weight, Scientific Polymer Products) from about 10 to about 90 percent by weight and ethylene/vinyl acetate (vinyl acetate content 40 percent by weight, Scientific Polymer Products) from about 90 to about 10 percent by weight in dichloromethane as well as in toluene; blends of poly(propylene) chlorinated (chlorine content 65 percent by weight, Scientific Polymer Products) from about 10 to about 90 percent by weight and poly(-caprolactone) (PLC-700, Union Carbide) from about 90 to about 10 percent by weight in dichloromethane; blends of poly(propylene) chlorinated (chlorine content 65 percent by weight, Scientific Polymer Products) from about 10 to about 90 percent by weight and poly(-chloroprene) (Scientific Polymer Products) from about 90 to about 10 percent by weight in dichlormethane; blends of poly(ethylene) chlorinated (chlorine content 48 percent by weight, Scientific Polymer Products) from about 10 to about 90 percent by weight and ethylene/vinyl acetate copolymer (vinyl acetate 40 percent by weight, Scientific Polymer Products) from about 90 to about 10 percent by weight in dichloromethane as well as in toluene; blends of poly(ethylene) chlorinated (chlorine content 42 percent by weight, Scientific Polymer Products) and poly(caprolactone) (PLC-700, available from Union Carbide) from about 90 to about 10 percent by weight dichlormethane; blends of poly(ethylene) chlorinated (chlorine content 36 percent by weight, Scientific Polymer Products) from about 10 to about 90 percent by weight and poly(-chloroprene) (Scientific Polymer Products) from about 90 to about 10 percent by weight in dichloromethane; blends of poly(ethylene) chlorosulfonated (chlorine content 43 percent by weight, sulfur content 1.1 percent by weight as chlorosulfone, available from Scientific Polymer Products) from about 10 to about 90 percent by weight and ethylene/vinyl acetate copolymer (vinyl acetate content, 70 percent by weight, available from Scientific Polymer Products) from about 90 to about 10 percent by weight; blends of from about 10 to about 90 percent by weight in water of poly(ethylene oxide) (POLY OX WSRN-3000 from Union Carbide) and from about 90 to about 10 percent by weight of a component selected from the group consisting of (1) hydroxypropyl methyl cellulose (methocel K35LV, available from Dow Chemical Company), (2) vinylmethyl ether/maleic acid copolymer (Gantzez S-95, available from GAF Corporation); (3) acrylamide/acrylic acid copolymer (Scientific Polymer Products), (4) carboxy methylhydroxyethyl cellulose sodium salt (CMHEC 43H, 37L, available from Hercules Chemical Company, CMHEC 43H is a high molecular weight polymer with carboxymethyl cellulose (CMC)/hydroxyethyl cellulose (HEC) ratio of 4:3, CMHEC 37L is a low molecular weight polymer with CMC/HEC ratio of 3:7); (5) hydroxyethyl cellulose (Natrosol 250LR, available from Hercules); (6) water soluble ethylhydroxyethyl cellulose (Bermocoll, available from Berol kem, AB, Sweden); (7) cellulose sulfate (Scientific Polymer Products); (8) poly(vinyl alcohol) (Scientific Polymer Products); (9) poly(vinyl pyrrolidone) (GAF Corporation), (10) hydroxybutyl methyl cellulose (Dow Chemical Company); (11) hydroxypropyl cellulose (Klucel Type E, available from Hercules); (12) poly(2-acrylamido-2-methyl propane sulfonic acid) (Scientific Polymer Products); (13) methyl cellulose (Dow Chemical Company); (14) hydroxyethylmethyl cellulose (available as HEM from British Celanese Ltd. and Tylose MH, MHK from Kalle A.G.); (15) poly(diethylene triamine-coadipic acid) (Scientific Polymer Products); (16) poly(imidazoline) quaternized (Scientific Polymer Products); (17) poly(ethylene imine) epichlorohydrin modified (Scientific Polymer Products); (18) poly(N,N-dimethyl-3,5-dimethylene piperidinium chloride) (Scientific Polymer Products); or (19) poly(ethylene imine) ethoxylated (Scientific Polymer Products).

The ink receiving layer may contain filler components in various effective amounts such as from 0.1 to about 60 percent by weight. Examples of fillers include colloidal silica present, for example, in one embodiment in an amount of 40 percent by weight (available as Syloid 74 from W. R. Grace Company); saran microsphere (available as Miralite 177 from Pierce and Stevens Canada Inc.) and cellulose particles of 10 microns size (Scientific Polymer Products). While it is not desired to be limited by theory, it is believed that the primary purpose of the filler is to spread and dry the liquid inks used in ink jet and certain xerographic systems such as those containing Isopar based liquid inks.

Specific examples of ink receiving layer compositions for dry inks used in some electrophotography and thermal transfer printing systems, for example of a thickness of from about 2 to about 25 microns on each side of the pigmented layer and preferably of a thickness of 5 to 10 microns, include cellulose propionate, poly(diallyl phthalate), poly(diallyl isophthalate), ethylene-vinyl acetate-vinyl alcohol terpolymer, poly(ethylene succinate), blends of chlorinated poly(ethylene) or chlorosulfanate poly(ethylene) in an amount of 75 percent by weight with ethylene/vinyl acetate copolymer or poly(-caprolactone) or poly(chloroprene) in an amount of 25 percent by weight. Incorporation of fillers such as colloidal silica in these aforementioned ink receiving layers in an effective amount of 25 percent by weight of the ink receiving layer renders them suitable for solvent based inks such as those used in dot matrix printers such as the commercially available Roland PR-1012.

Specific examples of ink receiving layer composition for xerography, thermal transfer, and more specifically that can be selected with water-based inks employed in lithography, or ink jet printing processes of, for example, a thickness of from about 2 to about 25 microns on each side of the pigmented polymer layer include hydrophilic blends of poly(ethylene oxide), 50 percent by weight, with another component, 50 percent by weight, selected from the group consisting of (1) hydroxypropyl methyl cellulose (methocel K35LV, available from Dow Chemical Company); (2) vinylmethyl ether/-maleic acid copolymer (Gantzez S-95, available from GAF Corporation); (3) acrylamide/acrylic acid copolymer (Scientific Polymer Products); (4) carboxy methylhydroxyethyl cellulose sodium salt (CMHEC 43H, 37L, available from Hercules Chemical Company, CMHEC 43H is a high molecular weight polymer with carboxymethyl cellulose (CMC)/hydroxyethyl cellulose (HEC) ratio of 4:3, CMHEC 37L is low molecular weight polymer with CMC/HEC ratio of 3:7); (5) hydroxyethyl cellulose (Natrosol 250LR, available from Hercules); (6) water soluble ethylhydroxyethyl cellulose (Bermocoll, available from Berol kem, AB, Sweden); (7) cellulose sulfate (Scientific Polymer Products); (8) poly(vinyl alcohol) (Scientific Polymer Products); (9) poly(vinyl pyrrolidone) (GAF Corporation); (10) hydroxybutyl methyl cellulose (Dow Chemical Company); (11) hydroxypropyl cellulose (Klucel Type E, available from Hercules); (12) poly(2-acrylamido-2-methyl propane sulfonic acid) (Scientific Polymer Products); (13) methyl cellulose (Dow Chemical Company); (14) hydroxyethylmethyl cellulose (British Celanese Ltd.); (15) poly(diethylene triamine-co-adipic acid) (Scientific Polymer Products); (16) poly(imidazoline) quaternized (Scientific Polymer Products); (17) poly(ethylene imine) epichlorohydrin modified (Scientific Polymer Products); (18) poly(N,N-dimethyl-3,5-dimethylene piperidinium chloride) (Scientific Polymer Products); or (19) poly(ethylene imine) ethoxylated (Scientific Polymer Products). Incorporation of filler components such as colloidal silica in the aforementioned hydrophilic blends in an effective amount of, for example, 40 percent by weight reduces the drying time of water or glycol based inks used in ink jet and lithographic printing and solvent based inks used in gravure printing or dot matrix printing processes.

The aforementioned pigmented antistatic and ink receiving polymer coatings can be present on both sides of the supporting substrates in various thicknesses depending on the coatings selected and the other components utilized; however, generally the total thickness of the polymer coatings is from about 7 to about 75 microns, and preferably from about 25 to about 50 microns. Moreover, these coatings can be applied by a number of known techniques including reverse roll, extrusion and dip coating processes. In dip coating, a web of material to be coated is transported below the surface of the coating material by a single roll in such a manner that the exposed site is saturated, followed by the removal of any excess by a blade, bar or squeeze rolls. With reverse roll coating, the premetered material is transferred from a steel applicator roll to the web material moving in the opposite direction on a backing roll. Metering is performed in the gap precision-ground chilled iron rolls. The metering roll is stationary or is rotating slowly in the opposite direction of the applicator roll. Also, in slot extrusion coating there is selected a flat die to apply coating materials with the die lips in close proximity to the web of material to be coated. Once the desired amount of coating has been applied to the web, the coating is dried at 25° to 100° C. in an air dryer.

In one specific process embodiment, the xerographic never-tear plastic papers of the present invention are prepared by providing a Mylar substrate in a thickness of from about 50 to about 75 microns, and apply to each side of the Mylar by dip coating process in a thickness of from about 5 to 50 microns, a pigmented coating of a blend comprised of a resin polymer binder such as hydroxypropyl cellulose, 75 percent by weight, and an inorganic pigment such as titanium dioxide, 25 percent by weight, which blend can be present in a concentration of 10 percent by weight of a mixture of an alcohol such as methanol (preferably 75 percent by weight) and water (25 percent by weight). Thereafter, the coating is air dried at 25° C. for 60 minutes in a fumehood equipped with adjustable volume exhaust system and the resulting white plastic sheet is subsequently dip coated with an ink receiving layer (coated on both sides) comprised of a blend of chlorinated rubber and ethylene/vinyl acetate copolymer in a thickness of from about 2 to about 25 microns. Thereafter, the coating is air dried and the resulting two layered structure coated paper can be utilized in a xerographic copier such as those available commercially as the Xerox Corporation 1005 TM.

In the known formation and development of xerographic images, there is generally applied to a latent image generated on a photoconductive member a toner composition (dry or liquid) of resin particles and pigment particles. Thereafter, the image can be transferred to a suitable substrate such as natural cellulose, the never-tear papers of the present invention, or plastic paper and affixed thereto by, for example, heat, pressure or combination thereof.

The known imaging technique in ink jet printing involves the use of one or more ink jet assemblies connected to a pressurized source of ink, which is comprised of water, glycols, and a colorant such as magenta, cyan, yellow or black dyes. Each individual ink jet includes a very small orifice usually of a diameter of 0.0024 inch, which is energized by magneto restrictive piezoelectric means for the purpose of emitting a continuous stream of uniform droplets of ink at a rate of 33 to 75 kilohertz. This stream of droplets is desirably directed onto the surface of a moving web of, for example, the paper of the present invention, which stream is controlled to permit the formation of printed characters in response to video signals derived from an electronic character generator and in response to an electrostatic deflection system.

In known thermal transfer printing, the printer is equipped with a data input-interface, printhead, a three color, such as magenta, cyan and yellow transfer ribbon, a mechanism to coordinate the combination of head, paper and ribbon motion, and a properly specified output material. The data from the input interface is fed to the thermal head which makes contact with the back of the ribbon substrate and melts the inks. The melted inks are then transferred to the never-tear papers of the present invention.

In known dot matrix printing, the printer is connected to an IBM-PC computer loaded with a screen/-printer software specially supplied for the printer. Any graphic images produced by the appropriate software on the screen can be printed by using the print screen key on the computer keyboard. The ink ribbons used in dot matrix printers are generally comprised of Mylar coated with blends of carbon black with reflex blue pigment dispersed in an oil, such as rape seed oil, and a surfactant, such as lecithin. Other correctable ribbons which are also used in typewriter printing can be selected and are usually comprised of Mylar coated with blends of soluble nylon, carbon black and mineral oil.

The optical density measurements recited herein, including the working Examples, were obtained on a Pacific Spectrograph Color System. The system consists of two major components, an optical sensor and a data terminal. The optical sensor employs a 6 inch integrating sphere to provide diffuse illumination and 8 degrees viewing. This sensor can be used to measure both transmission and reflectance samples. When reflectance samples are measured, a specular component may be included. A high resolution, full dispersion, grating monochromator was used to scan the spectrum from 380 to 720 nanometers. The data terminal features a 12 inch CRT display, numerical keyboard for selection of operating parameters, and the entry of tristimulus values; and an alphanumeric keyboard for entry of product standard information.

The following examples are being supplied to further define specific embodiments of the present invention, it being noted that these examples are intended to illustrate and not limit the scope of the present invention.

Parts and percentages are by weight unless otherwise indicated.

EXAMPLE I

There were prepared 10 coated paper sheets, each with a total thickness of 75 microns, by affecting a dip coating (both sides coated) of Mylar sheets (10) into a coating blend comprised of the resin binder hydroxypropyl cellulose (75 percent by weight) and the pigment, titanium dioxide (25 percent by weight), which blend was present in a concentration of 10 percent by weight in a mixture of methanol (75 percent by weight) and water (25 percent by weight). Subsequent to air drying for 60 minutes at 25° C. in a fumehood equipped with adjustable volume exhaust system and monitoring the difference in weight prior to and subsequent to coating, the resulting dried sheets had present on each side 2 grams, 25 microns in thickness, of the aforementioned pigmented resin binder layer. These sheets were then coated on both sides with a toner receiving layer comprised of chlorinated rubber and an ethylene/vinyl acetate copolymer (vinyl acetate content of 40 percent) present in dichloromethane in a concentration of 2 percent by weight. Subsequent to air drying for 60 minutes at 25° C. and monitoring the difference in weight prior to and subsequent to coating, the coated sheets had present on each side 200 milligrams, 2 microns in thickness, of the toner receiving polymer layer in contact with the pigmented layer. The average value of the maximum charge acceptance levels on both sides as determined with a static charge analyzer was about 1,150 volts, which decayed to about 100 volts on exposure to light. The exact amount of charge left on paper after the first print cannot be measured perfectly as this charge is easily discharged during the routine lab handling while making measurements. These coated papers evidenced no feeding problems during duplex imaging when imaged in a Xerox Corporation 1075 TM imaging apparatus, which apparatus contains a toner with carbon black pigment, and a charge enhancing additive (cetyl pyridinium chloride). The average optical density of the solid black area on the two sides of the above prepared 10 papers was at 1.25. None of the images on the 10 coated papers could be handwiped or lifted off with 3M scotch tape 60 seconds subsequent to their preparation.

EXAMPLE II

There were prepared by essentially repeating the procedure of Example I, 10 coated paper sheets, each with a thickness of 75 microns, by affecting a dip coating (both sides coated) of Mylar sheets (10) into a coating blend of hydroxypropyl cellulose, 55 percent by weight, titanium dioxide, 25 percent by weight, and poly(dimethylamine-coepichlorohydrin) quaternized, 20 percent by weight, which blend was present in a concentration of 10 percent by weight in a mixture of methanol (75 percent by weight) and water (25 percent by weight). After drying, these sheets had present on each side of the Mylar approximately 25 microns of the pigmented resin binder layer. The resulting 10 sheets were then coated with a toner receiving layer of poly(-propylene) chlorinated, 75 percent by weight, and an ethylene/vinyl acetate copolymer, 25 percent by weight (vinyl acetate content 40 percent), which blend was present in a concentration of 3 percent by weight in dichloromethane. The toner receiving layer had present on each side 300 milligrams of the blend in a thickness of 3 microns in contact with the pigmented layer. The maximum charge acceptance of these coated papers (both sides) was about 150 volts, and no duplex feeding problems resulted when images formed thereon were on a Xerox Corporation 1005 TM color imaging apparatus. The average optical density of the images were 1.6 (black), 0.80 (yellow), 1.45 (magenta) and 1.55 (cyan). These images could not be handwiped or lifted off with a 3M scotch tape 60 seconds subsequent to their preparation.

EXAMPLE III

There were prepared 10 coated paper sheets, by essentially repeating the procedure of Example I, each with a thickness of 75 microns, by affecting a dip coating (both sides coated) of Mylar sheets (10) into a coating blend of hydroxypropyl cellulose, 45 percent by weight, titanium dioxide, 25 percent by weight, and poly(N,N-dimethyl-3,5-dimethylene piperidinium chloride), 30 percent by weight, which blend was present in a concentration of 10 percent by weight in a mixture of methanol (75 percent by weight) and water (25 percent by weight). Subsequent to air drying at 25° C. for 60 minutes, these sheets had present on each side 2.0 grams, 25 micron in thickness, of the titanium dioxide pigmented resin binder layer. These sheets were tested on a static charge analyzer and had maximum charge acceptance of 200 volts which decayed instantly when exposed to light. The resulting 10 sheets were then further coated with a toner receiving layer comprised of a blend of chlorinated rubber, 75 percent by weight, and an ethylene/vinyl acetate (vinyl acetate content 40 percent by weight), 25 percent by weight, which blend was present in a concentration of 2 percent by weight in toluene. Subsequent to drying at 25° C. for 60 minutes, the toner receiving layer had present on each side 200 milligrams in a thickness of 2 microns of the toner receiving layer in contact with the pigmented binder layer. The maximum charge acceptance of the toner receiving layer remained at about 250 volts which decayed instantly when exposed to light. These coated papers evidenced no feeding problems during duplex imaging in the 1075 TM Xerox Corporation imaging apparatus, and yielded images with an average optical density of 1.3 (black). None of the images could be handwiped or lifted off with 3M Scotch tape 60 seconds subsequent to their preparation.

EXAMPLE IV

The coated papers of Examples I, II and III were fed through an Okimate-20 (Oki Company) thermal transfer printer. The resulting images had average optical density values of 1.3 (black), 0.9 (yellow), 1.25 (magenta) and 1.7 (cyan). These images could not be handwiped or lifted off with 3M scotch tape 60 seconds subsequent to their preparation.

EXAMPLE V

There were prepared 10 coated paper sheets, each with a thickness of 75 microns, by affecting a dip coating (both sides coated) of Mylar sheets (10) into a coating blend of vinyl pyrrolidone/vinyl acetate resin binder, (vinyl acetate content of 50 percent by weight) 80 percent by weight, and high brightness clay (Ultragloss 90), 20 percent by weight, which blend was present in a concentration of 10 percent by weight in a mixture of isopropanol (75 percent by weight) and water (25 percent by weight). Subsequent to air drying for 60 minutes at 25° C. in a fumehood equipped with adjustable volume exhaust system, the resulting dried sheets had 2.0 grams, 25 microns in thickness, of the clay resin layer. These sheets were further coated with an ink receiving layer comprised of a blend comprised of chlorinated poly(ethylene), (chlorine content 42 percent by weight), 60 percent by weight, poly(caprolactone), 20 percent by weight, and colloidal silica filler, 20 percent by weight, which blend was present in a concentration of 4 percent by weight in dichloromethane. Subsequent to drying, these coated sheets had present on both sides 400 milligrams, 5 microns in thickness, of the ink receiving layer. These coated papers were fed into the dot matrix printer, available from Roland Inc. as Roland PR-1012. The average optical density of the resulting images obtained was about 1.18 black. These images could not be removed by handwiping 60 seconds subsequent to their preparation.

EXAMPLE VI

There were prepared 10 coated paper sheets, each with a thickness of 75 microns, by affecting a dip coating, (both sides coated) of Mylar sheets (10) into a coating blend of hydroxypropyl cellulose resin binder, 75 percent by weight, and titanium dioxide, 25 percent by weight, which blend was present in a concentration of 10 percent by weight in methanol. Subsequent to air drying at 25° C. for 60 minutes in a fumehood, these resulting dried sheets had 2.0 grams, 25 microns in thickness, of the above resin binder, pigmented titanium dioxide layer. These sheets were then coated with an ink receiving layer of a blend comprised of chlorinated rubber (chlorine content 65 percent by weight), 60 percent by weight, and an ethylene/vinyl acetate (vinyl acetate content 40 percent by weight), 20 percent by weight, and colloidal silica filler, 20 percent by weight, which blend was present in a concentration of 4 percent by weight in dichloromethane. Subsequent to drying at 25° C. for 60 minutes, the resulting sheets had present on each side 400 milligrams, 5 microns in thickness, of the ink receiving layer in contact with the pigmented resin binder layer. The resulting never-tear coated papers were fed through a Xerox Corporation 1025 TM imaging apparatus, a Roland PR-1012 dot matrix printer, and a Xerox Corporation Memorywriter TM (typewriter), and images of optical density greater than 1.2 (about 1.3) were achieved in all instances. Furthermore, these coated papers could be written upon with a lead pencil as well as with a ball point pen with a water based liquid ink. The resulting images could not be handwiped or lifted with 3M scotch tape 60 seconds subsequent to their preparation.

EXAMPLE VII

There were prepared 10 coated paper sheets, each with a thickness of 75 microns, by affecting a dip coating (both sides coated) of Mylar sheets (10) into a coating blend of poly(vinyl pyrrolidone), resin binder, 90 percent by weight, and titanium dioxide, 10 percent by weight, which blend was present in a concentration of 10 percent by weight in methanol. Subsequent to air drying at 25° C. for 60 minutes in a fumehood, the resulting dried sheets had 1.5 gram, 20 microns in thickness, of the pigmented titanium dioxide resin binder layer. The resulting sheets were then coated with a blend comprised of hydroxypropyl methyl cellulose, 30 percent by weight, poly(ethylene oxide), 30 percent by weight, and colloidal silica, 40 percent by weight, which blend was present in a concentration of 5 percent by weight in water. Subsequent to air drying at 25° C. for 60 minutes, the resulting sheets had present on each side 500 milligrams of the ink receiving layer in a thickness of 6 microns in contact with the pigmented resin binder layer. The resulting never-tear paper coated sheets were fed through a Xerox Corporation 4020 TM ink jet printer and images of high optical density of 1.6 (black), 1.5 (magenta), 1.4 (cyan) and 0.95 (yellow) were obtained.

Other modifications of the present invention will occur to those skilled in the art subsequent to a review of the present application. These modifications, including equivalents thereof are intended to be included within the scope of the present invention.

What is claimed is:

1. A paper comprised of a plastic supporting substrate, a binder layer comprised of polymers selected from the group consisting of (1) hydroxypropyl cellulose, (2) poly(vinyl alkyl ether), (3) vinyl pyrrolidone/vinyl acetate, (4) quaternized vinyl pyrrolidone/dialkylaminoethyl/methacrylate,(5) poly(vinyl pyrrolidone), (6) poly(ethylene imine), and mixtures thereof; a pigment, or pigments; and an ink receiving polymer layer.

2. A paper in accordance with claim 1 wherein the polymer is present on both sides of the supporting substrate, and the ink receiving polymer layer is present on both sides of the polymer layer.

3. A paper in accordance with claim 1 wherein the polymer is comprised of (1) hydroxypropyl cellulose, (2) poly(vinyl methyl ether), (3) vinyl pyrrolidone/vinyl acetate copolymer with a vinyl acetate content of from about 40 to about 70 percent by weight, (4) quaternized vinyl pyrrolidone/dimethylamino ethyl/methacrylate copolymer, (5) poly(vinyl pyrrolidone), (6) poly(ethylene imine), or mixtures thereof.

4. A paper in accordance with claim 1 wherein inorganic white pigments are selected.

5. A paper in accordance with claim 1 wherein the pigments are selected from the group consisting of (1) titanium dioxide, (2) zinc oxide, (3) hydrated alumina, (4) barium sulfate, (5) calcium carbonate, (6) high brightness clays, (7) blends of calcium fluoride with silica, (8) blends of zinc sulfide and barium sulfate, and mixtures thereof.

6. A paper in accordance with claim 5 wherein the pigments or mixtures thereof are present in an amount of from about 2 to about 50 percent by weight of the polymer.

7. A paper in accordance with claim 1 where the ink receiving polymer layer is comprised of (1) poly(diallyl phthalate), (2) poly(diallyl isophthalate), (3) cellulose propionate, (4) ethylene-vinyl acetate-vinyl alcohol terpolymer, with ethylene content of from about 20 to about 60 percent by weight, vinyl acetate content of from about 40 to about 20 percent by weight and vinyl alcohol content of from about 40 to about 20 percent by weight, (5) blends of chlorinated rubber with ethylene/vinyl acetate copolymer, (6) blends of chlorinated rubber with poly(caprolactone), (7) blends of chlorinated rubber with poly(chloroprene), (8) blends of poly(ethylene) chlorinated with ethylene/vinyl acetate copolymer, (9) blends of poly(ethylene) chlorinated with poly(caprolactone), (10) blends of poly(ethylene) chlorinated with poly(chloroprene), (11) blends of poly(propylene) chlorinated with ethylene/vinyl acetate, (12) blends of poly(propylene) chlorinated with poly(caprolactone), (13) blends of poly(propylene) chlorinated with poly(chloroprene), (14) poly(ethylene succinate) and (15) blends of poly(ethylene) chlorosulfonated with ethylene/vinyl acetate, (16) blends of poly(ethylene oxide) with another component selected from the group consisting of (1) hydroxypropyl methyl cellulose; (2) vinylmethyl ether/maleic acid copolymer; (3) acrylamide/acrylic acid copolymer; (4) carboxymethylhydroxyethyl cellulose sodium salt; (5) hydroxyethyl cellulose; (6) water soluble ethylhydroxyethyl cellulose; (7) cellulose sulfate; (8) poly(vinyl alcohol); (9) poly(vinyl pyrrolidone); (10) hydroxybutylmethyl cellulose; (11) hydroxypropyl cellulose; (12) poly(2-acrylamido-2-methyl propane sulfonic acid); (13) methyl cellulose; (14) hydroxyethylmethyl cellulose; (15) poly(diethylene triamine-co-adipic acid); (16) poly(imidazoline) quaternized; (17) poly(ethylene imine)epichlorohydrin; (18) poly(N, N-dimethyl-3, 5-dimethylene piperidinium chloride); (19) ethoxylated poly(ethylene imine); and mixtures thereof.

8. A paper in accordance with claim wherein the chlorinated rubber, poly(propylene) chlorinated and poly(ethylene) chlorinated have a chlorine content of from about 25 to about 75 percent by weight.

9. A coated paper in accordance with claim 7 wherein the ethylene/vinyl acetate copolymer has a vinyl acetate content of from about 40 to about 80 percent by weight.

10. A paper in accordance with claim 1 wherein the ink receiving polymer layer is comprised of a blend of from about 10 to about 90 percent by weight of chlorinated rubber and from about 90 to about 10 percent by weight of an ethylene/vinyl acetate copolymer.

11. A paper in accordance with claim 10 wherein the vinyl acetate content is from about 40 percent by weight and the chlorine content in the chlorinated rubber is about 65 percent by weight.

12. A paper in accordance with claim 1 wherein the ink receiving polymer layer is comprised of a blend of from about 10 to about 90 percent by weight of chlorinated poly(propylene) and from about 90 to about 10 percent by weight of poly(caprolactone).

13. A coated paper in accordance with claim 1 wherein the ink receiving polymer is comprised of blends with from about 10 to about 90 percent by weight of chlorinated rubber and from about 90 to about 10 percent by weight of poly(caprolactone); blends with from about 10 to about 90 percent by weight of chlorinated rubber and from about 90 to about 10 percent by weight of poly(chloroprene); blends with from about 10 to about 90 percent by weight of poly(propylene) chlorinated and from about 90 to about 10 percent by weight of ethylene/vinyl acetate copolymer; blends with from about 10 to about 90 percent by weight of poly(propylene) chlorinated and from about 90 to about 10 percent by weight of poly(chloroprene); blends with from about 10 to about 90 percent by weight of poly(ethylene) chlorinated and from about 90 to about 10 percent by weight of ethylene/vinyl acetate copolymer; blends with from about 10 to about 90 percent by weight of poly(ethylene) chlorinated and from about 90 to about 10 percent by weight of poly(caprolactone); blends with from about 10 to about 90 percent by weight of poly(ethylene) chlorinated and from about 90 to about 10 percent by weight of poly(chloroprene); or blends with from about 10 to about 90 percent by weight of poly(ethylene) chlorosulfonated and from about 90 to about 10 percent by weight of ethylene/vinyl acetate copolymer.

14. A paper in accordance with claim 1 wherein the ink receiving layer is comprised of a blend with from about 10 to about 90 percent by weight of poly(ethylene oxide) and 90 to about 10 percent by weight of a component selected from the group consisting of (1) hydroxypropyl methyl cellulose; (2) vinylmethyl ether/maleic acid copolymer; (3) acrylamide/acrylic acid copolymer; (4) carboxymethylhydroxyethyl cellulose sodium salt; (5) hydroxyethyl cellulose; (6) water soluble ethylhydroxyethyl cellulose; (7) cellulose sulfate; (8) poly(vinyl alcohol); (9) poly(vinyl pyrrolidone); (10) hydroxybutylmethyl cellulose; (11) hydroxypropyl cellulose; (12) poly(2-acrylamido-2-methyl propane sulfonic acid); (13) methyl cellulose; (14) hydroxyethylmethyl cellulose; (15) poly(diethylene triamine-co-adipic acid); (16) poly(imidazoline) quaternized; (17) poly(ethylene imine)epichlorohydrin; (18) poly(N,N-dimethyl-3,5-dimethylene piperidinium chloride); or (19) ethoxylated poly(ethylene imine).

15. A paper in accordance with claim 1 wherein the pigmented layer contains poly(electrolytes).

16. A paper in accordance with claim 15 wherein the poly(electrolytes) are comprised of poly acrylic acid sodium salts, poly(N,N-dimethyl-3,5-dimethylene piperidinium chloride), quaternized poly(dimethylamine-epichlorohydrin), quaternized poly(imidazoline), or mixtures thereof.

17. A paper in accordance with claim 15 wherein the poly(electrolytes) are present in an amount of from about 2 to about 50 percent by weight of the polymer binder.

18. A paper in accordance with claim 1 wherein the ink receiving layer contains fillers.

19. A paper in accordance with claim 18 wherein the fillers are comprised of colloidal silica, polymeric microspheres, cellulose particles, or mixtures thereof.

20. A paper in accordance with claim 19 wherein the fillers or mixtures thereof are present in an amount of from about 0.1 to about 60 percent by weight of the ink receiving layer.

21. A paper in accordance with claim 1 wherein the supporting substrate is selected from the group consisting of cellulose acetate, cellophane, poly(sulfone), poly(propylene), poly(vinyl chloride), poly(ethylene terephthalate) and opaque Mylar.

22. A paper in accordance with claim 2 wherein the substrate is of a thickness of from 50 to 125 microns, the pigmented polymer layer on each side of the substrate is of a thickness of from about 5 to about 50 microns and the ink receiving layer on each side of the pigmented polymer layer is of a thickness of from about 2 to about 25 microns.

23. A paper in accordance with claim 13 wherein the paper is selected as an image receiving layer for an electrographic, or an electrophotographic imaging process.

24. A paper in accordance with claim 13 wherein the paper is selected as an image receiving layer for thermal transfer printing processes.

25. A paper in accordance with claim 15 wherein the paper is selected as an image receiving layer for ink jet printing processes.

26. A paper in accordance with claim 21 wherein the paper is selected as an image receiving layer for impact printing processes such as typewriters, dot matrix printers and crayons.

27. A coated never-tear paper comprised of a plastic supporting substrate, a resin binder layer in contact with the substrate and comprised of polymers selected from the group consisting of (1) hydroxypropyl cellulose, (2) poly(vinyl alkyl ether), (3) vinyl pyrrolidone/vinyl acetate, (4) quaternized vinyl pyrrolidone/dialkylaminoethyl/methacrylate, (5) poly(vinyl pyrrolidone), (6) poly(ethylene imine), and mixtures thereof; and an inorganic pigment, or pigments; and an ink receiving polymer layer in contact with the resin binder layer.

28. A paper in accordance with claim 27 wherein the inorganic pigment is titanium dioxide.

29. A paper in accordance with claim 27 wherein the resin binder polymer with pigment is present on both sides of the supporting substrate, and the ink receiving polymer layer is present on both sides of the resin binder polymer layer.

30. A paper in accordance with claim 27 wherein the polymer is comprised of (1) hydroxypropyl cellulose, (2) poly(vinyl methyl ether), (3) vinyl pyrrolidone/vinyl acetate copolymer with a vinyl acetate content of from about 40 to about 70 percent by weight, (4) quaternized vinyl pyrrolidone/dimethylamino ethyl/methacrylate copolymer, (5) poly(vinyl pyrrolidone), (6) poly(ethylene imine), or mixtures thereof.

31. A paper comprised of a plastic supporting substrate, a polymer layer with a pigment or pigments, and an ink receiving layer.

32. Never-tear papers comprised of a plastic supporting substrate, a polymer layer with pigments therein, and an ink receiving layer in contact with the polymer layer.

33. A paper comprised of a plastic supporting substrate; a binder layer comprised of a polymer selected from the group consisting of (1) hydroxypropyl cellulose, (2) poly(vinyl alkyl ether), (3) vinyl pyrrolidone/vinyl acetate, (4) quaternized vinyl pyrrolidone/dialkylaminoethyl/methacrylate, (5) poly(vinyl pyrrolidone), (6) poly(ethylene imine), and mixtures thereof; and a pigment selected from the group consisting of (1) titanium dioxide, (2) zinc oxide, (3) hydrated alumina, (4) barium sulfate, (5) calcium carbonate, (6) high brightness clays, (7) blends of calcium fluoride with silica, (8) blends of zinc sulfide and barium sulfate, and mixtures thereof.

34. A paper in accordance with claim 33 wherein the polymer is present on the horizontal surfaces of the supporting substrate.

35. A paper in accordance with claim 1 wherein the ink receiving polymer layer is present on the horizontal exposed surfaces of the polymer binder layer.

36. A never-tear paper comprised of a plastic supporting substrate and, in contact therewith a binder layer comprised of a polymer selected from the group consisting of (1) hydroxypropyl cellulose, (2) poly(vinyl alkyl ether), (3) vinyl pyrrolidone/vinyl acetate, (4) quaternized vinyl pyrrolidone/dialkylaminoethyl/methacrylate, (5) poly(vinyl pyrrolidone), (6) poly(ethylene imine), and mixtures thereof; and a pigment, or pigments; and an ink receiving top polymer layer.

37. A never-tear paper in accordance with claim 36 wherein the polymer layer is present on the exposed horizontal surfaces of the plastic supporting substrate.

38. A never-tear paper in accordance with claim 36 wherein the ink receiving layer present on the horizontal exposed surfaces of the polymer binder layer.

39. A paper in accordance with claim 1 wherein the binder layer comprised of polymers is in contact with the plastic supporting substrate and is present on one horizontally exposed surface thereof.

* * * * *